(12) United States Patent
Takasumi

(10) Patent No.: US 10,387,999 B2
(45) Date of Patent: Aug. 20, 2019

(54) IMAGE PROCESSING APPARATUS, NON-TRANSITORY COMPUTER-READABLE MEDIUM STORING COMPUTER PROGRAM, AND IMAGE PROCESSING METHOD

(71) Applicant: Olympus Corporation, Hachioji-shi, Tokyo (JP)

(72) Inventor: Shinya Takasumi, Akiruno (JP)

(73) Assignee: Olympus Corporation, Tokyo (JP)

( * ) Notice: Subject to any disclaimer, the term of this patent is extended or adjusted under 35 U.S.C. 154(b) by 176 days.

(21) Appl. No.: 15/492,727

(22) Filed: Apr. 20, 2017

(65) Prior Publication Data

US 2017/0365042 A1   Dec. 21, 2017

(30) Foreign Application Priority Data

Jun. 15, 2016  (JP) ................ 2016-118686

(51) Int. Cl.
*G06T 5/00*  (2006.01)
*G06T 7/90*  (2017.01)

(52) U.S. Cl.
CPC ........... *G06T 5/002* (2013.01); *G06T 5/007* (2013.01); *G06T 7/90* (2017.01); *G06T 2207/10024* (2013.01)

(58) Field of Classification Search
CPC .......... G06T 5/002; G06T 5/007; G06T 7/90; G06T 2207/10024; G09G 3/00
See application file for complete search history.

(56) References Cited

U.S. PATENT DOCUMENTS

| | | | |
|---|---|---|---|
| 6,441,867 B1* | 8/2002 | Daly ............... | G06T 5/001 348/607 |
| 8,139,887 B2 | 3/2012 | Kobayashi | |
| 8,417,064 B2* | 4/2013 | Wakazono ....... | G06T 5/008 382/167 |
| 9,565,411 B2* | 2/2017 | Takasumi ........ | H04N 9/735 |
| 2008/0129732 A1* | 6/2008 | Johnson ......... | G06T 7/0002 345/424 |
| 2012/0249801 A1* | 10/2012 | Nozaki ........... | G06T 5/008 348/164 |
| 2015/0043815 A1* | 2/2015 | Tan ............... | H04N 19/147 382/166 |

FOREIGN PATENT DOCUMENTS

JP    4983415    5/2012

* cited by examiner

*Primary Examiner* — Wesley J Tucker
(74) *Attorney, Agent, or Firm* — John C. Pokotylo; Pokotylo Patent Services

(57) ABSTRACT

An image processing apparatus includes a smoothing section configured to smooth, for an image after gradation conversion with which gradation display on a monitor becomes appropriate, a signal with a higher Weber ratio, to a signal value, of a quantization error caused by the gradation conversion with higher strength, and a random component addition section configured to add a larger random component to the signal with the higher Weber ratio excluding a neighborhood of a minimum signal value for an image after the smoothing.

6 Claims, 14 Drawing Sheets

| L00 | L01 | L02 |
|-----|-----|-----|
| L10 | L11 | L12 |
| L20 | L21 | L22 |

IMAGE PROCESSING APPARATUS, NON-TRANSITORY COMPUTER-READABLE MEDIUM STORING COMPUTER PROGRAM, AND IMAGE PROCESSING METHOD

CROSS REFERENCE TO RELATED APPLICATION

This application claims benefit of Japanese Application No. 2016-118686 filed in Japan on Jun. 15, 2016, the entire contents of which are incorporated herein by this reference.

BACKGROUND OF THE INVENTION

1. Field of the Invention

The present invention relates to an image processing apparatus which performs spatial filter processing for an image after gradation conversion, a non-transitory computer-readable medium storing a computer program, and an image processing method.

2. Description of the Related Art

While an 8-bit signal has been a mainstream as a current video signal, a tone jump in gradation reproduction may occur due to quantization roughness in the 8-bit signal, and may be visually recognized as a false contour. The false contour is a phenomenon that a level difference between adjacent flat portions is visually recognized so that gradation looks discontinuous.

On the other hand, Japanese Patent No. 4983415, for example, describes a multibit technique for decompressing the number of bits composing an inputted digital image signal, and further describes a technique for improving a false contour without blurring an entire image by subjecting only a minute amplitude signal to low-pass filter processing. According to the technique, an effect of reducing a false contour is expected to be obtained by blurring a boundary occurring in a level difference between flat portions using a low-pass filter.

A visual characteristic of a person is said to apply to Weber-Fechner's law.

SUMMARY OF THE INVENTION

According to an aspect of the present invention, there is provided an image processing apparatus, including a gradation conversion section configured to convert gradation of an image according to a gradation conversion characteristic with which gradation display on a monitor becomes appropriate, a smoothing section configured to smooth a signal with a higher Weber ratio, to a signal value, of a quantization error caused by the gradation conversion with higher strength for an image after the gradation conversion, and a random component addition section configured to add a larger random component to the signal with the higher Weber ratio excluding a neighborhood of a minimum signal value for an image after the smoothing.

According to another aspect of the present invention, there is provided a non-transitory computer-readable medium storing a computer program for causing a computer to execute a gradation conversion step of converting gradation of an image according to a gradation conversion characteristic with which gradation display on a monitor becomes appropriate, a smoothing step of smoothing a signal with a higher Weber ratio, to a signal value, of a quantization error caused by the gradation conversion with higher strength for an image after the gradation conversion, and a random component addition step of adding a larger random component to the signal with the higher Weber ratio excluding a neighborhood of a minimum signal value for an image after the smoothing.

According to yet another aspect of the present invention, there is provided an image processing method, including a gradation conversion step of converting gradation of an image according to a gradation conversion characteristic with which gradation display on a monitor becomes appropriate, a smoothing step of smoothing a signal with a higher Weber ratio, to a signal value, of a quantization error caused by the gradation conversion with higher strength for an image after the gradation conversion, and a random component addition step of adding a larger random component to the signal with the higher Weber ratio excluding a neighborhood of a minimum signal value for an image after the smoothing.

DETAILED DESCRIPTION OF THE PREFERRED EMBODIMENT

An embodiment of the present invention will be described below with reference to the drawings.

First Embodiment

Figure 1:
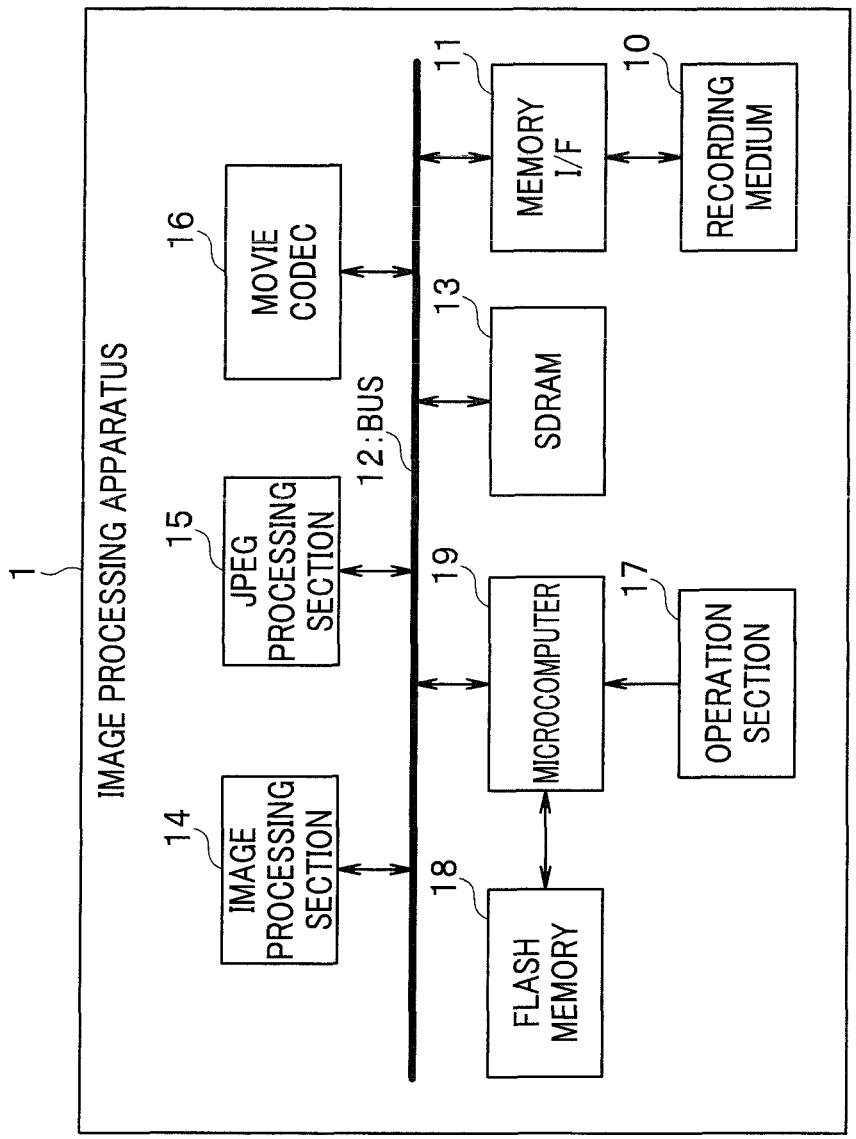
FIG. 1 is a block diagram illustrating a configuration of an image processing apparatus according to a first embodiment of the present invention.

FIGS. 1 to 21 illustrate a first embodiment 1 of the present invention, where FIG. 1 is a block diagram illustrating a configuration of an image processing apparatus 1.

As illustrated in FIG. 1, the image processing apparatus 1 includes a recording medium 10, a memory interface (memory I/F) 11, a bus 12, an SDRAM (static random access memory) 13, an image processing section 14, a JPEG (joint photographic experts group) processing section 15, a movie codec 16, an operation section 17, a flash memory 18, and a microcomputer 19.

The recording medium 10 is a recording section including a memory card detachably attached to the image processing apparatus 1, for example, and storing image data (movie data, still image data, etc.) in a nonvolatile manner. Therefore, the recording medium 10 need not have a configuration specific to the image processing apparatus 1.

While the image processing apparatus 1 inputs image data via the recording medium 10, for example, in the present embodiment, the present invention is not limited to this. The image processing apparatus 1 may be configured to input image data via a communication line or the like, or may be configured to process image data acquired by picking up an image by an image pickup apparatus when the image processing apparatus 1 is incorporated into the image pickup apparatus.

The image data is a digital color image signal, i.e., so-called RAW (read after write) image data obtained by photoelectrically converting an optical image of an object formed by a lens by a color image pickup device including a color filter in a primary color Bayer array and subjecting the optical image to A/D (analog-to-digital) conversion, for example. However, the present invention is not limited to this. For example, the image data may be a digital monochrome image signal.

Image data after image processing by the image processing section 14 may be outputted and displayed on a monitor serving as a display device, or may be outputted and recorded on the recording medium 10.

The memory I/F 11 is a readout control section configured to perform control to read out image data recorded on the recording medium 10 and is also a recording control section configured to perform control to record image data after image processing on the recording medium 10.

The bus 12 is a transfer path for transferring various types of data and control signals from a certain location to another location within the image processing apparatus 1. The bus 12 in the present embodiment is connected to the memory I/F 11, the SDRAM 13, the image processing section 14, the JPEG processing section 15, the movie codec 16, and the microcomputer 19.

The image data read out of the recording medium 10 by the memory I/F 11 is transferred via the bus 12, and is stored once in the SDRAM 13.

The SDRAM 13 is a storage section configured to temporarily store various types of data such as image data read out of the recording medium 10, image data processed or being processed by the image processing section 14, and image data processed or being processed by the movie codec 16.

The image processing section 14 performs various types of image processing for image data, and generates an image for display or recording.

The JPEG processing section 15 is a compression/decompression section configured to compress or decompress still image data using JPEG processing. The still image data processed by the JPEG processing section 15 is recorded as a JPEG file on the recording medium 10 via the memory I/F 11 after a header or the like is added thereto by the microcomputer 19.

The movie codec 16 compresses and decompresses the movie data using an appropriate processing system such as Motion JPEG or MPEG (moving picture experts group). The movie data processed by the movie codec 16 is recorded as a movie file on the recording medium 10 via the memory I/F 11 after a header or the like is added thereto by the microcomputer 19.

The operation section 17 is used for performing various types of operation inputs to the image processing apparatus 1, and a user can perform operations such as ON/OFF of power to the image processing apparatus 1, start/end of image processing, setting of various types of parameters in image processing, and readout and storage of an image file from and in the recording medium 10. When the user operates the operation section 17, a signal corresponding to an operation content is outputted to the microcomputer 19.

The flash memory 18 is a storage medium configured to store a processing program (including an image processing program serving as a program for performing an image processing method by the image processing apparatus 1) executed by the microcomputer 19 and various types of information on the image processing apparatus 1 in a non-volatile manner. An example of information stored by the flash memory 18 includes a parameter, a table, or a function used for image processing, or a setting value set by a user. The information stored by the flash memory 18 is read by the microcomputer 19.

The microcomputer 19 is a control section for integrally controlling the image processing apparatus 1. The microcomputer 19 reads a parameter or the like required for processing from the flash memory 18 according to the processing program stored in the flash memory 18 upon receiving the operation input by the user from the operation section 17, and performs various types of sequences corresponding to an operation content.

When an intended image is selected, to start to perform image processing, for example, image data is read out via the memory I/F 11 from the recording medium 10 based on control by the microcomputer 19, and is stored in the SDRAM 13 via the bus 12. Further, the image processing section 14 performs image processing based on the control by the microcomputer 19 so that image data after the image processing is stored again in the SDRAM 13. The image data after the image processing is displayed on the monitor. The user can also perform image processing again by seeing an image displayed on the monitor to change a setting value of a processing parameter, as needed. The image data is subjected to JPEG compression by the JPEG processing section 15 when still image data or is subjected to movie compression by the movie codec 16 when movie data or is recorded as an image file on the recording medium 10.

Note that the image processing apparatus 1 may be configured as a dedicated processing apparatus, and may be configured to cause a computer to execute an image processing program. In the cases, a monitor connected to the dedicated processing apparatus or the computer can be used as a display section configured to display an image.

The image processing apparatus 1 may be incorporated into the image pickup apparatus. In this case, a monitor such as a rear face liquid crystal monitor or an electronic viewfinder monitor incorporated into the image pickup apparatus can be used as a display section configured to display an image.

Figure 2:
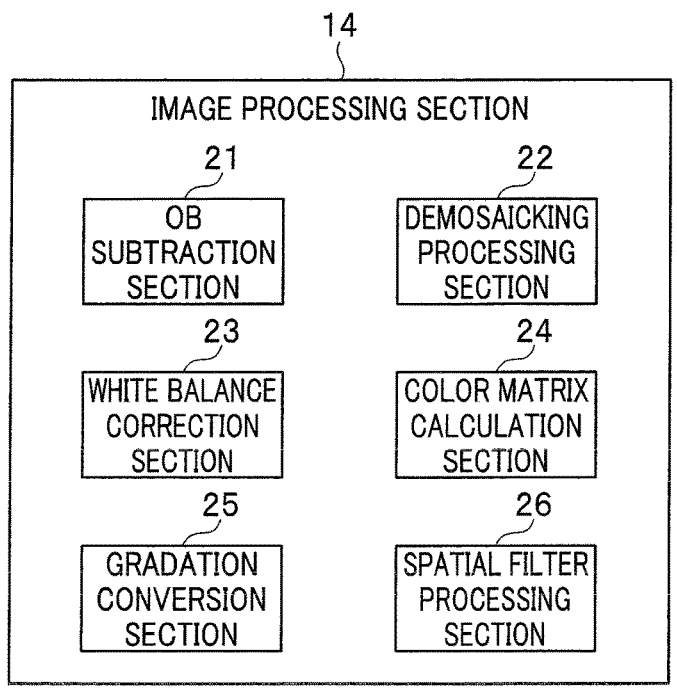
FIG. 2 is a block diagram illustrating a configuration of an image processing section in the first embodiment.
Figure 4:
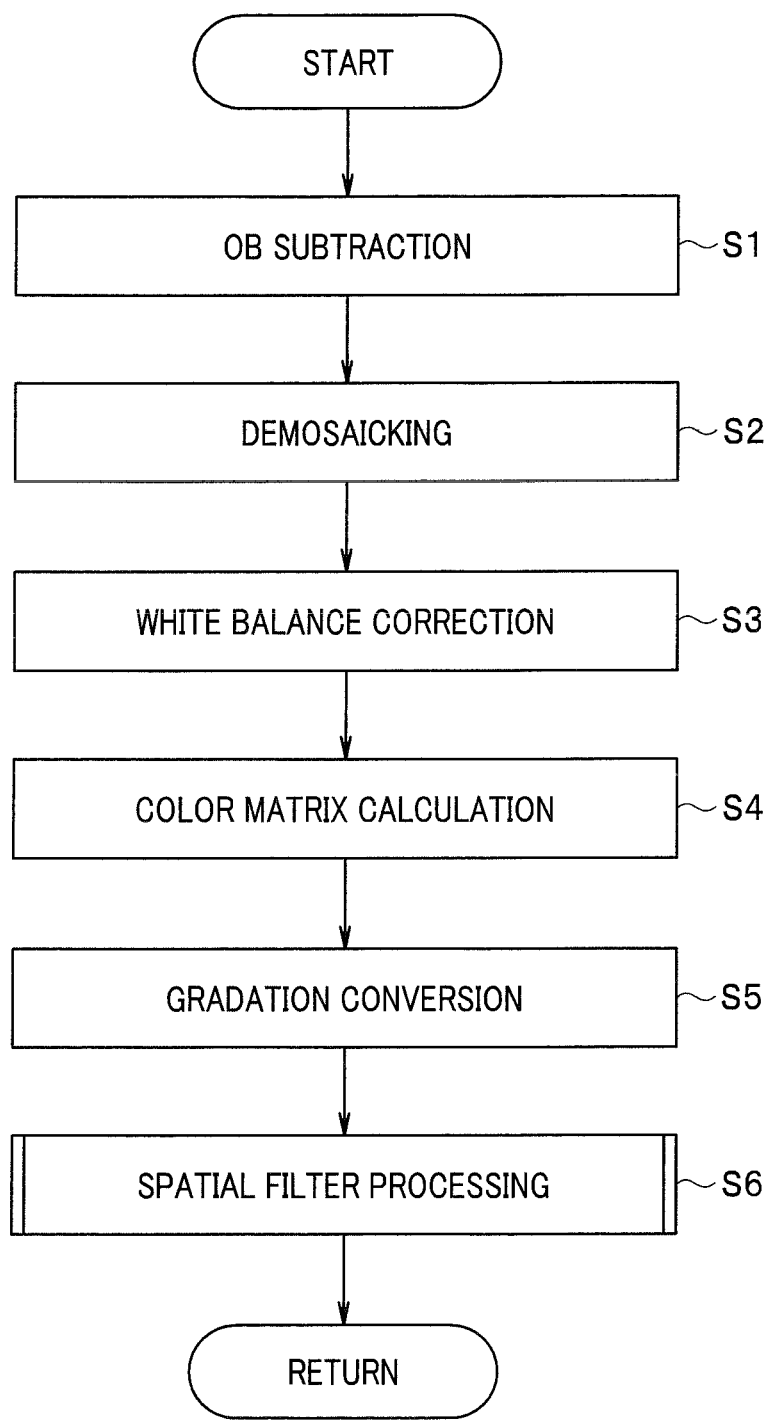
FIG. 4 is a flowchart illustrating the function of an image processing section in the first embodiment.

Then, FIG. 2 is a block diagram illustrating a configuration of the image processing section 14, and FIG. 4 is a flowchart illustrating the function of the image processing section 14.

As illustrated in FIG. 2, the image processing section 14 includes an OB (optical black) subtraction section 21, a demosaicking processing section 22, a white balance correction section 23, a color matrix calculation section 24, a gradation conversion section 25, and a spatial filter processing section 26.

When main processing (not illustrated) in the image processing apparatus 1 shifts to processing illustrated in FIG. 4, the OB subtraction section 21 subtracts, when image data contains an OB component, the OB component (step S1). Therefore, if the image data contains the OB component, the OB component may also be recorded on the recording medium 10 and read out by the memory I/F 11.

The demosaicking processing section 22 interpolates, in an RGB (red-green-blue) Bayer image in which only a color signal in one color exists for each of pixels, a color signal of the pixel, in which the color signal is missing, to each of color missing signals of each of pixels based on the color signals in the same color at the pixels in the neighborhood of the pixel, to generate an image in which a color signal in R, G, and B colors exists (step S2).

The white balance correction section 23 multiplies an R signal and a B signal by a gain, for example, so that an object in white also looks white on an image, to perform white balance correction (step S3).

The color matrix calculation section 24 performs processing for constituting R, G, and B components of each of pixel data composing image data as a matrix of three rows and one column (or one row and three columns), for example, and performing matrix operation of a color matrix of three rows and three columns to the pixel data, to reproduce the color of the object more faithfully (step S4). Each of color matrix coefficients constituting the color matrix of three rows and three columns is previously determined depending on a white balance mode (e.g., a solar light mode, an electric bulb mode, or a fluorescent light mode) set when image data is acquired by shooting, for example, and is recorded on the flash memory 18, for example.

The gradation conversion section 25 converts gradation of an image according to a gradation conversion characteristic with which gradation display on a monitor becomes appropriate (step S5). More specifically, the gradation conversion section 25 performs gamma conversion processing serving as nonlinear processing, for example, as gradation conversion processing for the image data. Note that, while the gamma conversion processing is taken as an example of the gradation conversion processing, the present invention is not limited to this. KNEE processing in which a gamma conversion curve is approximated by a broken line, or other appropriate processing may be performed.

The spatial filter processing section 26 performs spatial filter processing for making a false contour inconspicuous while suppressing resolution deterioration of an image after the gradation conversion (step S6).

Then, the processing returns to the main processing in the image processing apparatus 1.

Figure 11:
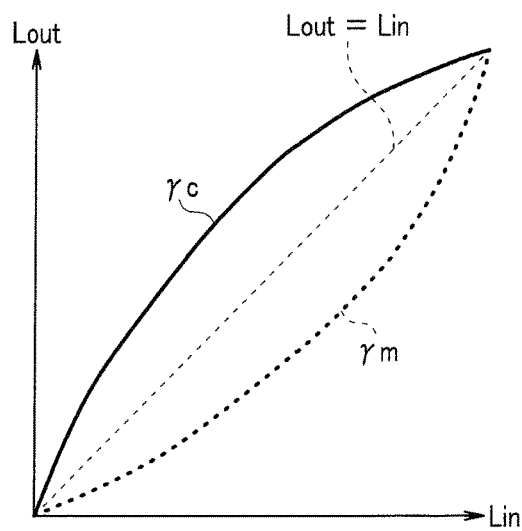
FIG. 11 is a diagram illustrating a gradation conversion characteristic of a monitor and a gradation conversion characteristic for correction performed by the image processing apparatus according to the gradation conversion characteristic of the monitor.

FIG. 11 is a diagram illustrating a gradation conversion characteristic of the monitor and a characteristic of gradation conversion for correction performed by the image processing apparatus 1 according to the gradation conversion characteristic of the monitor. In FIG. 11, a horizontal axis represents an input signal value Lin, and a vertical axis represents an output signal value Lout after gradation conversion.

As illustrated in FIG. 11, a gradation conversion curve γm of the monitor is generally designed to have a characteristic that a slope of the output signal value Lout to the input signal value Lin increases as the input signal value Lin increases, and γ=2.2 is standardly set in an appropriate expression in which the γ-th power of the input signal value Lin becomes the output signal value Lout if the monitor is an RGB monitor, for example.

Therefore, gradation conversion processing for correction by the gradation conversion section 25 is performed so that a gradation characteristic of an image becomes linear when the image is displayed on the monitor. A specific example includes gamma conversion processing. Basically, an inverse function of the gradation conversion curve γm of the monitor may be a gradation conversion curve γc for correction. When γ=2.2 is set in the aforementioned RGB monitor as an example, γ=(1/2.2) may be set as a gradation conversion curve for correction. However, in practice, a gradation characteristic may be desired to be changed. Therefore, an appropriate correction is added to the gradation conversion curve γc for correction at this time.

When the gradation conversion section 25 performs the gradation conversion processing for correction, the gradation characteristic of the image becomes a characteristic suited to observe the image using the monitor.

Figures 12, 13:
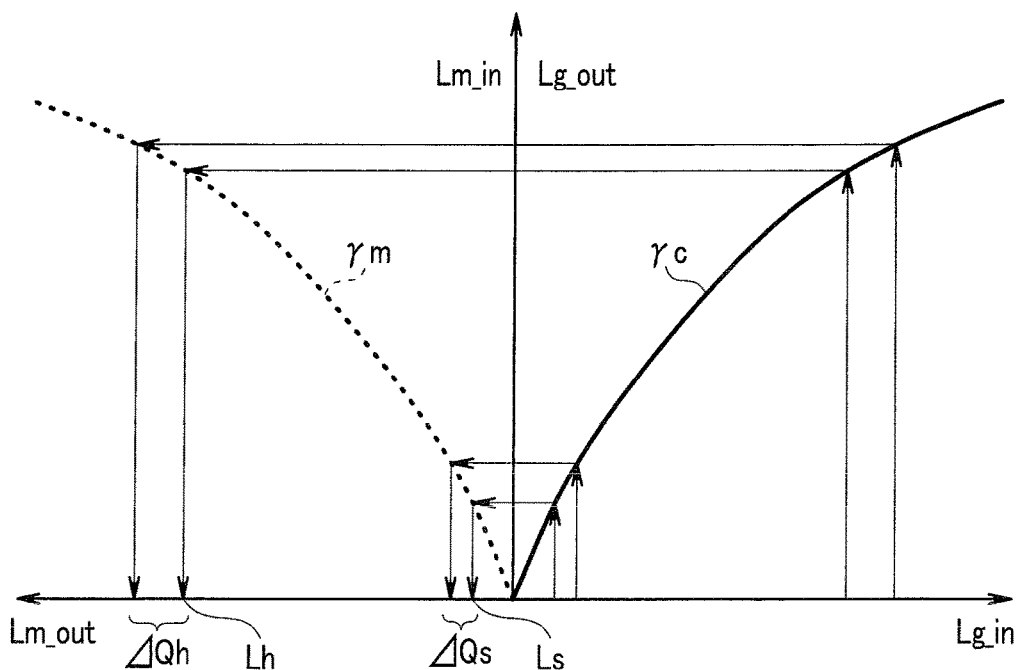
FIG. 12 is a diagram illustrating an example of a quantization error caused by gradation conversion in the first embodiment.
FIG. 13 is a diagram illustrating an example of a filter configuration of a smoothing filter in the first embodiment.

When the gradation conversion processing such as the gamma conversion processing is performed, a quantization error occurs. This point will be described with reference to FIG. 12. FIG. 12 is a diagram illustrating an example of the quantization error caused by the gradation conversion. In FIG. 12, Lg_in is an input signal value to the gradation conversion section 25, Lg_out is an output signal value from the gradation conversion section 25, Lm_in is an input signal value to the monitor, and Lm_out is an output signal value from the monitor (a signal value used for monitor display). It is assumed that Lg_out=Lm_in.

The quantization error occurs in not only conversion from an analog signal to a digital signal but also conversion from a digital signal to a digital signal.

That is, the smaller the input signal value Lg_in to the gradation conversion section 25 is, the larger a slope of a gradation conversion curve γc for correction is. As the input signal value Lg_in increases, the slope gradually decreases. At this time, a step between adjacent gradations (a difference between a gradation level to be paid attention to and a gradation level closest thereto) occurring at the output signal value Lm_out is ΔQs on the side on which the signal value is small, and is ΔQh on the side on which the signal value is large. A large-small relationship therebetween is given by the following expression:

$$\Delta Qh > \Delta Qs$$

A law that a minimum stimulus difference (a difference threshold of a stimulus) ΔR in which when stimulus intensity has changed from R to (R+ΔR) in a sense of a person, the change can be noticed is proportional to the intensity R of a basic stimulus to be a reference is known as a Weber's law. The Weber's law also applies to a visual characteristic of the person, and ΔR/R at this time is referred to as a Weber ratio.

On the other hand, a stimulus difference occurring due to a quantization error becomes as given by the following expression because of comparison by the Weber ratio:

$$(\Delta Qh/Lh) < (\Delta Qs/Ls)$$

Thus, a stimulus difference in a region where the signal value is small becomes larger than a stimulus difference in a region where the signal value is large. This relationship holds in general gradation conversion such as gamma conversion. This indicates that a gradation step (tone jump) occurring due to the quantization error and thus a false contour is easier to observe in the region where the signal value is small than in the region where the signal value is large.

Figure 3:
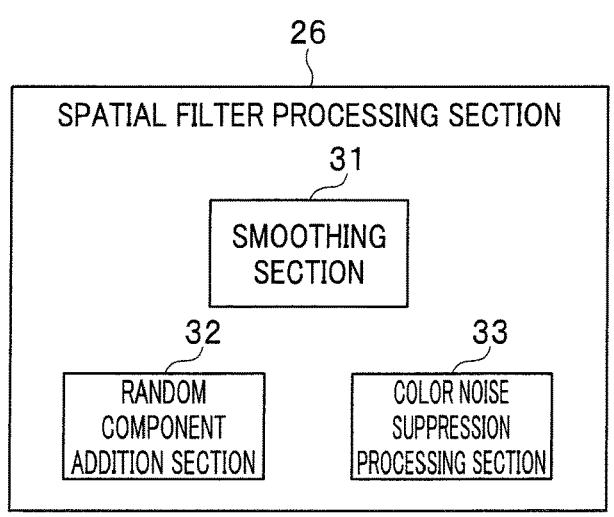
FIG. 3 is a block diagram illustrating a configuration of a spatial filter processing section in the first embodiment.

FIG. 3 is a block diagram illustrating a configuration of the spatial filter processing section 26.

The spatial filter processing section 26 includes a smoothing section 31, a random component addition section 32, and a color noise suppression processing section 33, as illustrated in FIG. 3, to perform spatial filter processing in consideration of the aforementioned visual characteristic of a person. However, the color noise suppression processing section 33 performs processing for a color image. Therefore, the color noise suppression processing section 33 need not be provided if it processes only a monochrome signal.

The smoothing section 31 performs smoothing processing for an image after gradation conversion.

The random component addition section 32 adds a random component to an image after smoothing.

The color noise suppression processing section 33 performs processing for suppressing color noise in an image to which a random component has been added when the image is a color image. If a random component is individually added to each of an R signal, a G signal, and a B signal, color noise may occur due to disruption of a color balance. The color noise suppression processing section 33 adjusts an amount of the random component added to the R signal and an amount of the random component added to the B signal based on an amount of the random component added to the G signal, to suppress the color noise.

Figure 5:
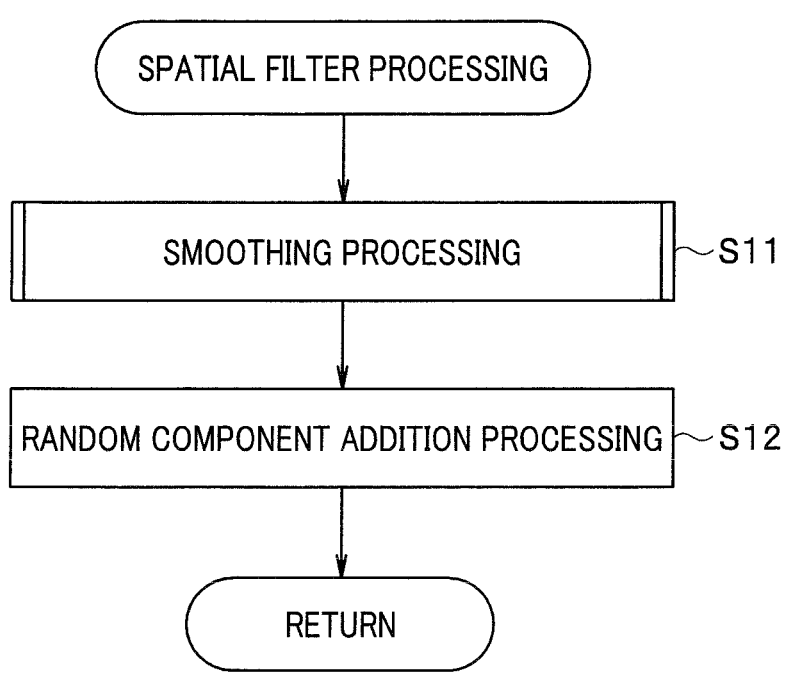
FIG. 5 is a flowchart illustrating a basic content of spatial filter processing in step S6 illustrated in FIG. 4 in the first embodiment.

FIG. 5 is a flowchart illustrating a basic content of the spatial filter processing in step S6 illustrated in FIG. 4. The spatial filter processing illustrated in FIG. 5 is also applied to both a monochrome image and a color image. However, the spatial filter processing is preferably applied particularly to the monochrome image because processing specific to the color image as described below with reference to FIG. 6 is not performed.

When the spatial filter processing is started, the smoothing section 31 performs smoothing processing for an image (step S11), the random component addition section 32 performs processing for adding a random component to an image after the smoothing (step S12), and the processing returns to the processing illustrated in FIG. 4.

Figure 6:
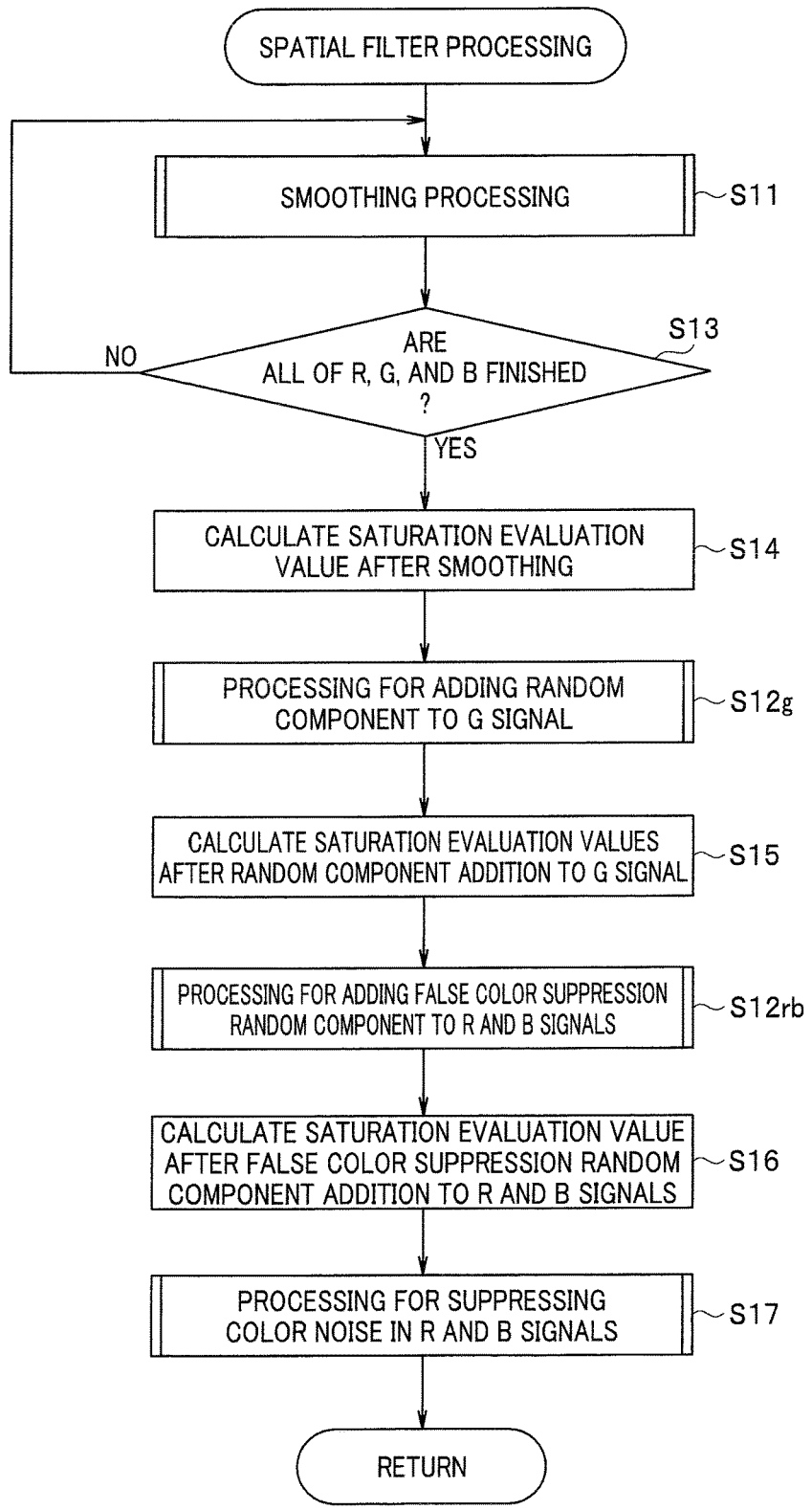
FIG. 6 is a flowchart illustrating a processing content for an RGB (red-green-blue) color image of spatial filter processing in step S6 illustrated in FIG. 4 in the first embodiment.

FIG. 6 is a flowchart illustrating a processing content for an RGB color image of the spatial filter processing in step S6 illustrated in FIG. 4.

When the spatial filter processing is started, the smoothing section 31 performs processing for smoothing any one of the R, G, and B signals for the image (step S11), and determines whether the processing for smoothing all the R, G, and B signals has been finished (step S13).

If it is determined that the smoothing processing has not yet been finished in step S13, the processing returns to step S11. In step S11, the smoothing section 31 processes the color signal which has not yet been processed. Thus, the smoothing processing is performed individually for each of the color signals (the R signal, the G signal, and the B signal).

Figure 7:
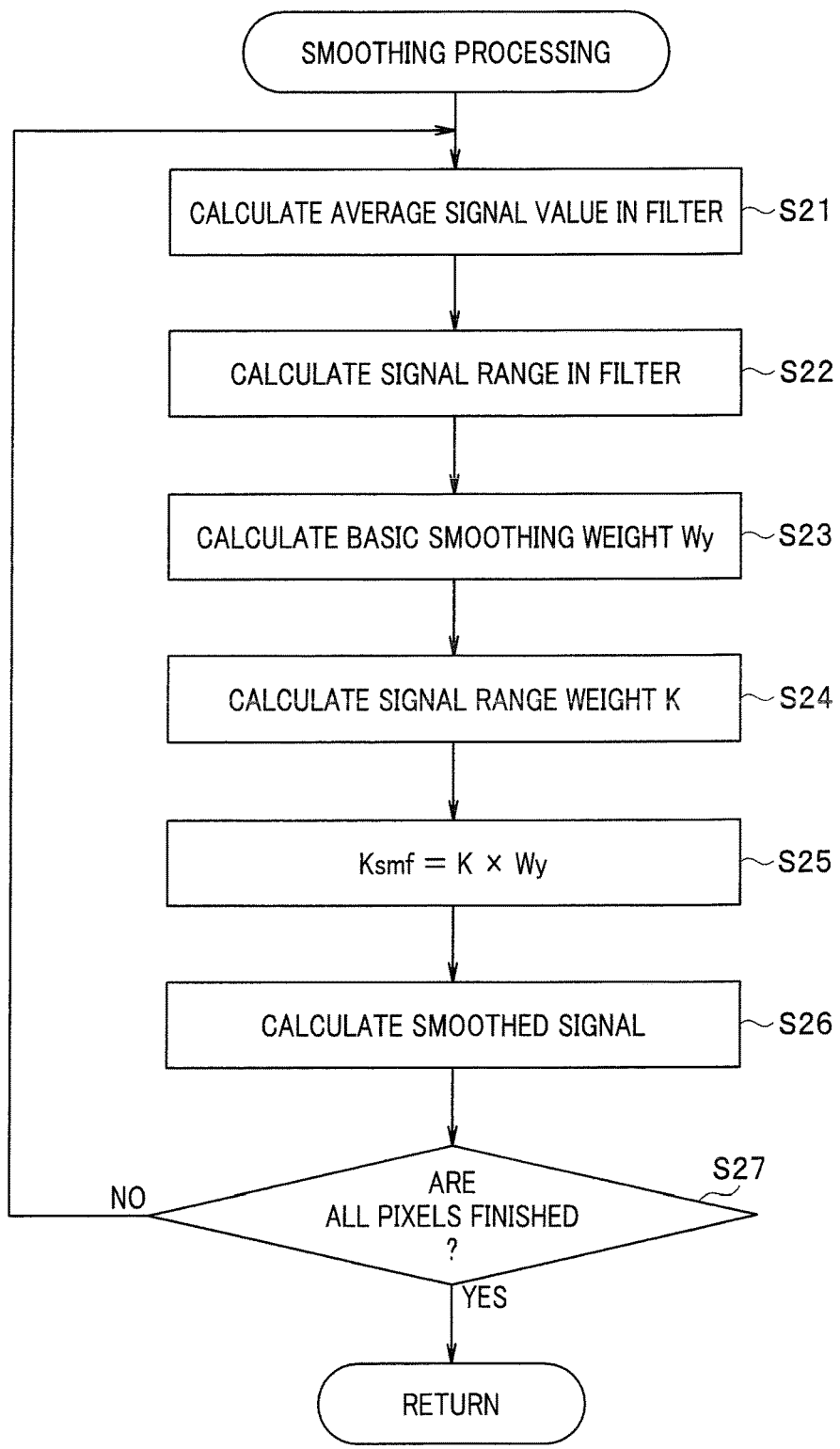
FIG. 7 is a flowchart illustrating smoothing processing in step S11 illustrated in FIG. 5 or 6 in the first embodiment.

FIG. 7 is a flowchart illustrating the smoothing processing in step S11 illustrated in FIG. 5 or 6.

When the smoothing processing is started, the smoothing section 31 calculates an average signal value Lave of respective signal values L at pixels within a smoothing filter (step S21).

FIG. 13 is a diagram illustrating an example of a filter configuration of the smoothing filter. If a smoothing filter composed of three by three pixels, as illustrated in FIG. 13, for example, is used, the average signal value Lave is calculated, as given by the following equation:

$$Lave = (L00 + L01 + L02 + L10 + L11 + L12 + L20 + L21 + L22)/9$$

Then, the smoothing section 31 calculates a signal range Range of a signal value L at each of the pixels within the smoothing filter (step S22). More specifically, when Lmax and Lmin are respectively a maximum signal value and a minimum signal value among L00, L01, L02, L10, L11, L12, L20, L21, and L22, the signal range Range is calculated, as given by the following equation:

$$Range = Lmax - Lmin$$

Figure 14:
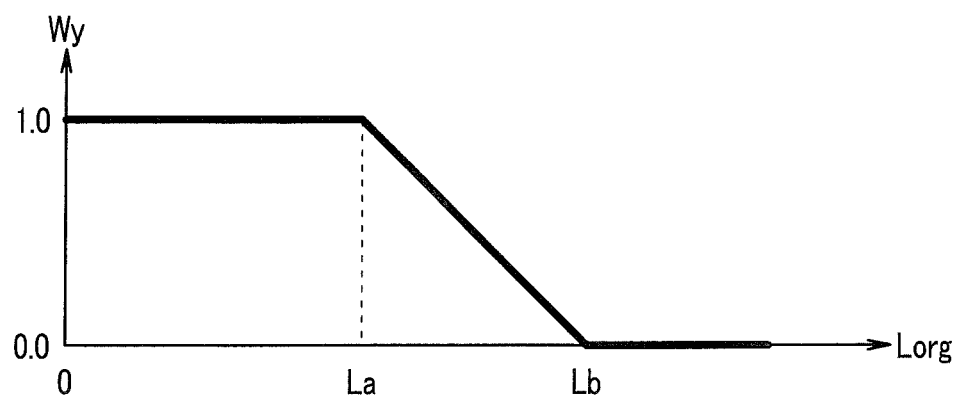
FIG. 14 is a diagram illustrating an example of a weight for changing filter strength of the smoothing filter in the first embodiment depending on a signal value.

Then, the smoothing section 31 calculates a basic smoothing weight Wy (step S23). FIG. 14 is a diagram illustrating an example of a weight for changing filter strength of the smoothing filter depending on a signal value.

A pixel position at the center in a smoothing filter composed of three by three pixels, as illustrated in FIG. 13, becomes a target pixel position. The smoothing section 31 sets the basic smoothing weight Wy indicating that the larger a value is, the higher smoothing strength is based on a signal value Lorg=L11 at the pixel position at the center.

As described above, a Weber ratio takes a higher value in a region where a signal value is small than in a region where the signal value is large. A basic smoothing weight Wy is set to take a higher value in a region where a signal value is small than in a region where the signal value is large, as illustrated in FIG. 14.

More specifically, a basic smoothing weight Wy is set to take a value within a range of not less than 0 nor more than 1.0 (0≤Wy≤1.0) depending on a signal value Lorg at a target pixel. Moreover, in an example illustrated in FIG. 14, the basic smoothing weight Wy takes a value of 1.0 when 0≤Lorg≤La, monotonously decreases from 1.0 to 0.0 when La<Lorg≤Lb, and takes a value of 0.0 when Lb<Lorg.

Thus, the smoothing section 31 smoothes a signal with a higher Weber ratio of a quantization error caused by gradation conversion to a signal value with higher strength for an image after gradation conversion. More specifically, a signal satisfying 0≤Lorg≤La with a higher Weber ratio than a signal satisfying Lb<Lorg, for example, is smoothed with higher strength by making the basic smoothing weight Wy larger for example.

Figure 15:
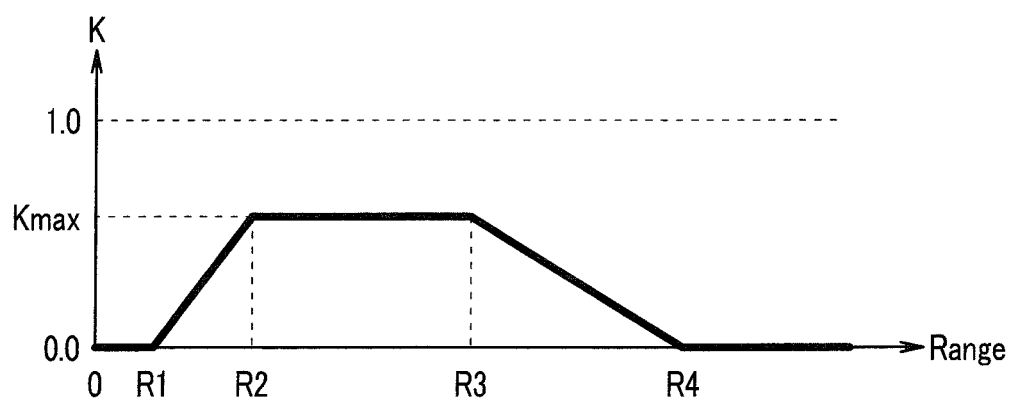
FIG. 15 is a diagram illustrating an example of a signal range weight for further changing the filter strength of the smoothing filter in the first embodiment depending on a signal range of a signal value.

Then, the smoothing section 31 calculates a signal range weight K (step S24). FIG. 15 is a diagram illustrating an example of a signal range weight K for further changing filter strength of the smoothing filter depending on a signal range Range of a signal value L.

The signal range weight K indicates that the larger a value is, the higher smoothing strength is, and is set to take a value within a range of not less than 0 nor more than 1.0 depending on the signal range Range of the signal value L at each of pixels within the smoothing filter centered at the target pixel. Therefore, a maximum value Kmax of the signal range weight K also becomes not more than 1.0. FIG. 15 illustrates an example in which the maximum value Kmax is less than 1.

Moreover, in an example illustrated in FIG. 15, the signal range weight K takes a value of 0.0 when 0≤Range≤R1, monotonously increases from 0.0 to Kmax when R1<Range≤R2, takes a value of Kmax when R2<Range≤R3, monotonously decreases from Kmax to 0.0 when R3<Range≤R4, and takes a value of 0.0 when R4<Range.

Thus, the smoothing section 31 further performs weighting for making smoothing strength lower when a signal range Range serving as a signal value difference between a maximum signal value Lmax and a minimum signal value Lmin within an applied smoothing filter is not more than a predetermined lower limit threshold value (R1 as a specific example) or not less than a predetermined upper limit threshold value (R4 as a specific example) than when the signal Range is between the lower limit threshold value and the upper limit threshold value (R1<Range<R4).

A region where the signal range Range serving as the signal value difference is small hardly needs to be smoothed because a tone jump hardly occurs. A region where the signal range Range is preferably not smoothed because it is an edge to avoid deterioration of the edge. Thus, only a region where it is assumed that the signal range Range is within a predetermined range and a tone jump occurs is to be smoothed.

Then, the smoothing section 31 calculates a smoothing weight Wsmf to be applied to a target pixel as a multiplication value of the basic smoothing weight Wy and the signal range weight K, as given by the following equation (step S25):

$$Wsmf = K \times Wy$$

The smoothing section 31 calculates a signal value Lsmf after smoothing corresponding to the target pixel, as given by the following equation (step S26):

$$Lsmf = (1 - Wsmf) \times Lorg + Wsmf \times Lave$$

Therefore, the smoothing weight Wsmf is a coefficient indicating, when the original signal value Lorg of the target pixel and the average signal value Lave within the smoothing filter centered around the target pixel are synthesized to obtain the signal value Lsmf after the smoothing, how much weight is applied to the average signal value Lave.

Then, the smoothing section 31 determines whether smoothing processing for all the pixels within the image has been finished (step S27).

If the smoothing section 31 determines that the smoothing processing has not yet been finished, the processing returns to step S21 after moving a target pixel position. In step S21, the aforementioned processing is performed for the subsequent target pixel.

Thus, the smoothing section 31 performs the smoothing processing while sequentially moving the target pixel position. If it is determined that the processing for all the pixels has been finished in step S27, the processing returns to the processing illustrated in FIG. 5 or 6.

Note that the threshold values La and Lb illustrated in FIG. 14 and the threshold values R1 to R4 and the maximum value Kmax illustrated in FIG. 15 in the aforementioned processing respectively take optimized values depending on the type of color signal, i.e., which of the R signal, the G signal, and the B signal the color signal is (therefore, as an example, La to be applied to the R signal and La to be applied to the G signal respectively take generally different values). More generally, a graph illustrated in FIG. 14 is optimized for each of the color signals. Similarly, a graph illustrated in FIG. 15 is optimized for each of the color signals.

While the multiplication value of the basic smoothing weight Wy illustrated in FIG. 14 and the signal range weight K illustrated in FIG. 15 is taken as the smoothing weight Wsmf in the foregoing, simplification processing for directly using the basic smoothing weight Wy as the smoothing weight Wsmf by omitting the signal range weight K, for example, may be performed.

Thus, if it is determined that the processing for smoothing the R signal, the G signal, and the B signal has been finished in step S13 illustrated in FIG. 6, the color noise suppression processing section 33 calculates a saturation evaluation value S after the smoothing (step S14).

As a specific example, in the present embodiment, an R saturation evaluation value Sr is calculated as a ratio G/R of the G signal to the R signal, and a B saturation evaluation value Sb is calculated as a ratio G/B of the G signal to the B signal (however, the present invention is not limited to such a calculation method).

Therefore, the color noise suppression processing section 33 calculates a second R saturation evaluation value Sr_smf after the smoothing as a ratio of a G signal value Gsmf after the smoothing to an R signal value Rsmf after the smoothing while calculating a second B saturation evaluation value Sb_smf after the smoothing as a ratio of the G signal value Gsmf after the smoothing to a B signal value Bsmf after the smoothing, as given by the following equations:

$$Sr\_smf = Gsmf / Rsmf$$

$$Sb\_smf = Gsmf / Bsmf$$

(Note that a first R/B saturation evaluation value and a third R/B saturation evaluation value will be described below).

Then, the random component addition section 32 performs processing for adding a random component to the G signal (step S12g). That is, the random component addition section 32 adds, when the image after the smoothing is an RGB color image, a random component depending on the signal value of each of the R signal, the G signal, and the B signal, and first adds the random component for the G signal value Gsmf after the smoothing.

Figure 8:
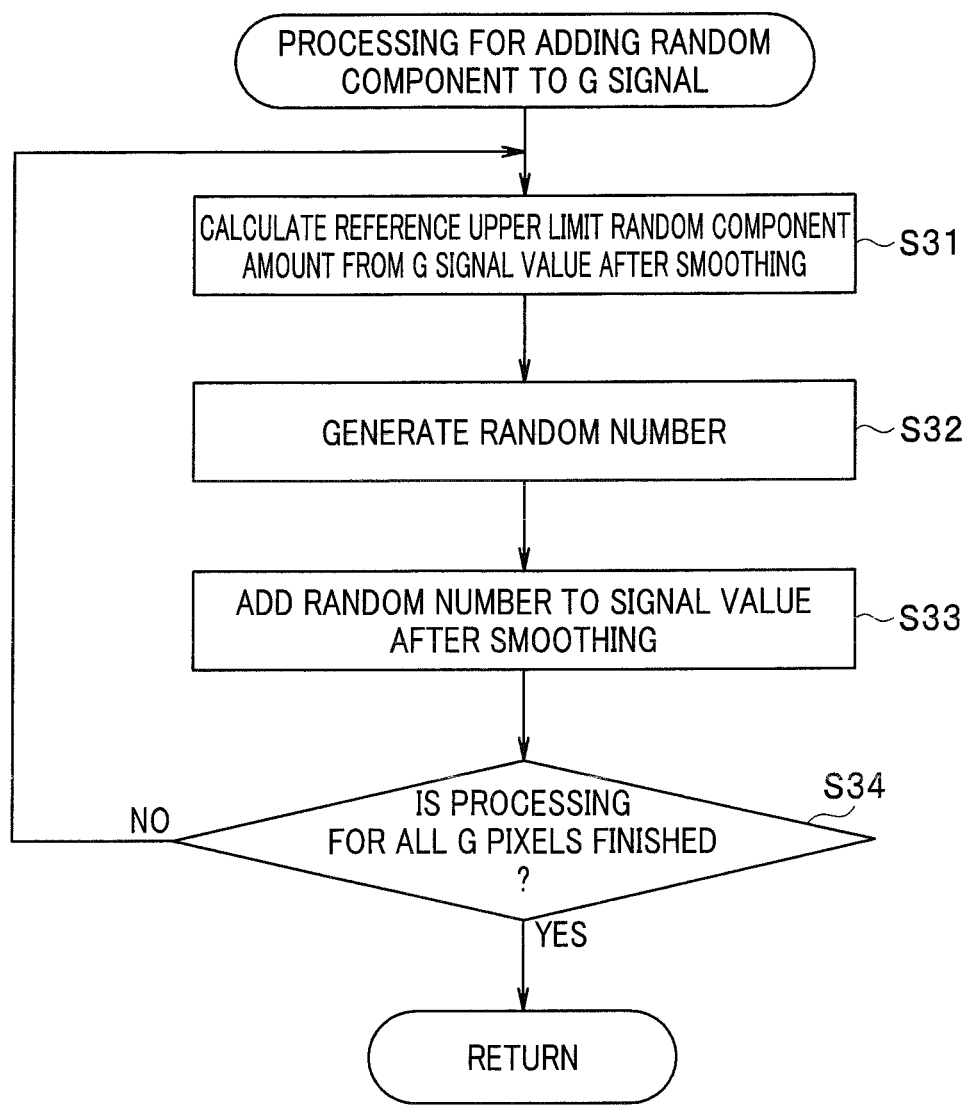
FIG. 8 is a flowchart illustrating processing for adding a random component to a G signal in step S12g illustrated in FIG. 6 in the first embodiment.

FIG. 8 is a flowchart illustrating the processing for adding the random component to the G signal in step S12g illustrated in FIG. 6. Note that the random component addition processing in step S12 illustrated in FIG. 5 is performed similarly to the processing illustrated in FIG. 8 (e.g., the G signal illustrated in FIG. 8 may be read as a luminance signal when the image is a monochrome image).

When the random component addition processing is started, the random component addition section 32 uses a certain pixel as a target pixel to calculate a reference upper limit random component amount Nmax based on the G signal value Gsmf after the smoothing at the target pixel (step S31).

Figure 16:
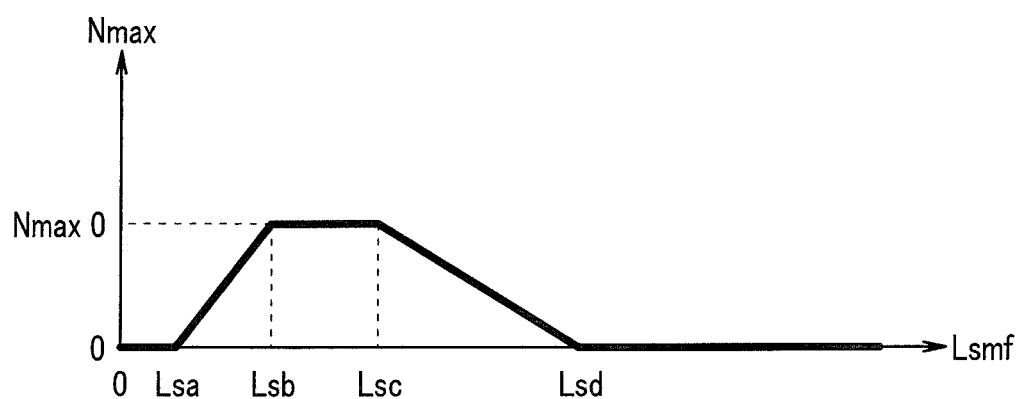
FIG. 16 is a diagram illustrating an example of a reference upper limit random component amount for changing the size of an added random component depending on a signal value in the first embodiment.

FIG. 16 is a diagram illustrating an example of a reference upper limit random component amount Nmax for changing the size of a random component to be added depending on a signal value. A signal after smoothing may be read as Rsmf when the R signal, Bsmf when the B signal, and Gsmf when the G signal, although written as Lsmf in FIG. 16.

Therefore, in step S31, the random component addition section 32 calculates the reference upper limit random component amount Nmax by referring to FIG. 16 based on the G signal value Gsmf after the smoothing.

The reference upper limit random component amount Nmax is set to take a value of 0 when the signal value Lsmf after the smoothing satisfies $0 \le Lsmf \le Lsa$, monotonously increase when $Lsa < Lsmf < Lsb$, an upper limit value Nmax0 when $Lsb \le Lsmf \le Lsc$, monotonously decrease when $Lsc < Lsmf < Lsd$, and take a value of 0 when $Lsc \le Lsmf$, for example.

That is, when the signal value Lsmf is small (e.g., $Lsmf \le Lsa$), the Weber ratio increases, as described above. Therefore, noise becomes conspicuous when superimposed. Thus, a noise amount is suppressed. When the signal value Lsmf is large (e.g., $Lsd \le Lsmf$), the Weber ratio decreases. Therefore, even if there is a gradation step (a tone jump), noise becomes inconspicuous, and need not be superimposed. Thus, a noise amount is suppressed. Ahead of and behind a certain signal region where a predetermined amount of noise is superimposed ($Lsb \le Lsmf \le Lsc$ in an example illustrated in FIG. 16). Thus, a noise amount is made to asymptotically approach 0 (from Lsb to Lsa or from Lsc to Lsd).

Thus, the random component addition section 32 adds a larger random component (e.g., a larger random component than that added to a signal satisfying $Lsc < Lsmf$) to a signal with a higher Weber ratio excluding the neighborhood of a minimum signal value ($0 < Lsmf < Lsb$ in the example illustrated in FIG. 16) (e.g., a signal satisfying $Lsb \le Lsmf \le Lsc$) for the image after the smoothing.

A function N(a), which outputs a random number of not less than (−a/2) nor more than (a/2) can be written, as given by the following equation, using a function N0(a) for outputting a random number of not less than 0 nor more than a.

$$N(a) = N0(a) - a/2$$

The random component addition section 32 generates a random number N (Nmax×Ws) using the function N(a) (step S32). While Ws is a saturation weight, as described below, Ws is set to 1 in processing for adding a random component to the G signal (therefore, this is equivalent to generating a random number N(Nmax)).

The random number N (Nmax×Ws) thus generated is taken as a random component amount N, as given by the following equation:

$$N = N(Nmax \times Ws)$$

The random component amount N is added to the signal value Lsmf after the smoothing, as given by the following equation:

$$Lrnd = Lsmf + N$$

The random component addition section 32 calculates a signal value Lrnd after the random component addition (step S33).

More specifically, the processing for adding the random component to the G signal is performed. Therefore, a G signal value Grnd after the random component addition is calculated by the following equation:

$$Grnd = Gsmf + N$$

Then, the random component addition section 32 determines whether processing for all G pixels has been finished (step S34).

If it is determined that the processing for all the G pixels has not yet been finished, the processing returns to step S31, described above. In step S31, the random component addition section 32 performs processing for the subsequent G pixel.

On the other hand, if it is determined that the processing for all the G pixels has been finished, the processing returns to the processing illustrated in FIG. 6.

Then, the random component addition section 32 calculates a first R saturation evaluation value Se_grnd and a first B saturation evaluation value Sb_grnd after the random component addition to the G signal (step S15).

More specifically, the random component addition section 32 calculates a ratio of the G signal value Grnd after the random component addition to the R signal value Rsmf after the smoothing as a first R saturation evaluation value Sr_grnd while calculating a ratio of the G signal value Grnd after the random component addition to the B signal value Bsmf after the smoothing as a first B saturation evaluation value Sb_grnd, as given by the following equations:

$$Sr\_grnd = Grnd/Rsmf$$

$$Sb\_grnd = Grnd/Bsmf$$

The random component addition section 32 performs processing for adding a false color suppression random component to the R signal and the B signal (step S12rb).

Figure 9:
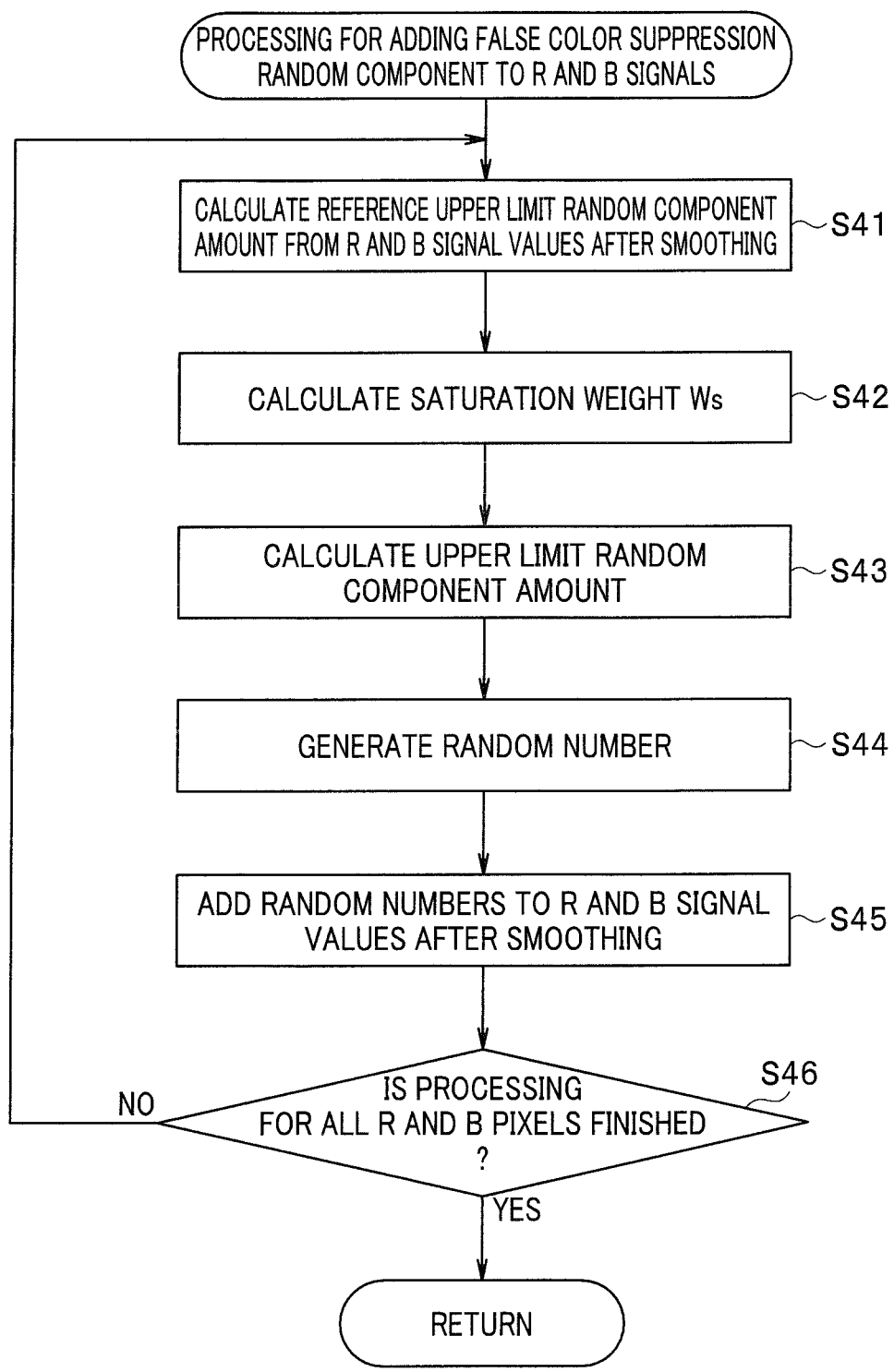
FIG. 9 is a flowchart illustrating processing for adding a false color suppression random component to R and B signals in step S12rb illustrated in FIG. 6 in the first embodiment.

FIG. 9 is a flowchart illustrating the processing for adding the false color suppression random component to the R and B signals in step S12rb illustrated in FIG. 6.

When the processing for adding the false color suppression random component is started, the random component addition section 32 uses a certain pixel as a target pixel to calculate a reference upper limit random component amount Nmax based on the R signal value Rsmf after the smoothing at the target pixel while calculating a reference upper limit random component amount Nmax based on the B signal value Bsmf after the smoothing at the target pixel (step S41).

The random component addition section 32 calculates the reference upper limit random component amount Nmax for the R signal by referring to a graph as illustrated in FIG. 16 based on the R signal value Rsmf after the smoothing while calculating the reference upper limit random component amount Nmax by referring to the graph as illustrated in FIG. 16 based on the B signal value Bsmf after the smoothing, like in step S31 illustrated in FIG. 8.

The graph illustrated in FIG. 16 is optimized for each color signal. Therefore, a graph for the R signal and a graph for the B signal, for example, are not generally the same. Therefore, even if an R signal value Rsmf and a B signal value Bsmf at a certain pixel are the same, the reference upper limit random component amount Nmax to be calculated generally takes values which differ for the R signal and the B signal.

Then, the random component addition section 32 calculates a saturation weight Ws for the R signal and a saturation weight Ws for the B signal (step S42).

Figure 17:
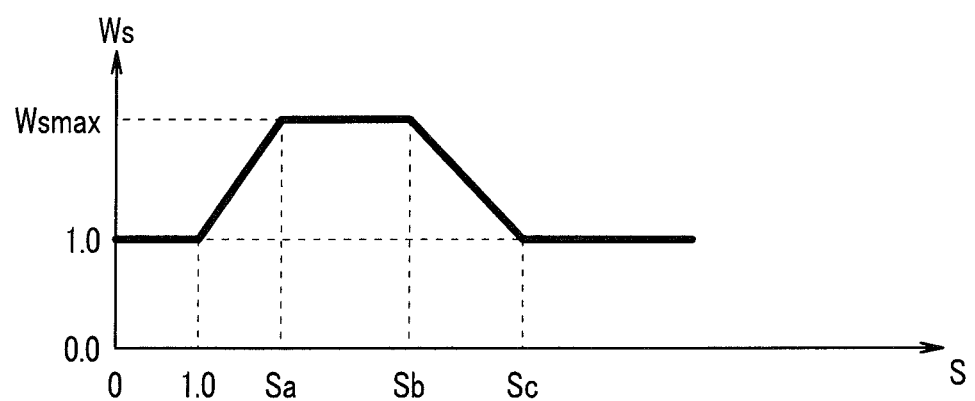
FIG. 17 is a diagram illustrating an example of a saturation weight for changing the size of an added random component depending on a saturation evaluation value in the first embodiment.

More specifically, the random component addition section 32 calculates the saturation weight Ws for the R signal by referring to a graph as illustrated in FIG. 17 based on the first R saturation evaluation value Sr_grnd after the random component addition to the R signal, which has been calculated in step S15 illustrated in FIG. 6, and similarly calculates the saturation weight Ws for the B signal by referring to the graph as illustrated in FIG. 17 based on the first B saturation evaluation value Sb_grnd after the random component addition to the G signal.

FIG. 17 is a diagram illustrating an example of a saturation weight Ws for further changing the size of a random component to be added depending on a saturation evaluation value S.

The saturation weight Ws is set to take a value of 1.0 when the saturation evaluation value S satisfies $0 \leq S \leq 1.0$, monotonously increase when $1.0 < S < Sa$, take an upper limit value Wsmax (Wsmax>1.0) when $Sa \leq S \leq Sb$, monotonously decrease when $Sb < S < Sc$, and take a value of 1.0 when $Sc \leq S$, for example.

The graph illustrated in FIG. 17 is optimized for each color signal, like each of the aforementioned graphs. Therefore, a graph for the R signal and a graph for the B signal, for example, are not generally the same.

The saturation weight Ws is set to remain a value of 1.0 when the saturation evaluation value S is small ($S \leq 1.0$) and the saturation evaluation value S is large ($Sc \leq S$) and take a larger value than 1.0 when the saturation evaluation value S is in a predetermined range ($Sa \leq S \leq Sb$) so that a random component amount becomes larger.

Thus, the random component addition section 32 performs weighting for increasing a random component to add the random component to the R signal value Rsmf when the first R saturation evaluation value Sr_grnd is in a predetermined range (a range of $1.0 < S < Sc$ illustrated in FIG. 17 as a specific example), and performs weighting for increasing a random component to add the random component to the B signal value Bsmf when the first B saturation evaluation value Sb_grnd is in a predetermined range (similarly, a range of $1.0 < S < Sc$ illustrated in FIG. 17).

The random component addition section 32 multiplies the reference upper limit random component amount Nmax, which has been calculated in step S41, and the saturation weight Ws, which has been calculated in step S42, to calculate an upper limit random component amount (Nmax×Ws) (step S43).

The random component addition section 32 then generates a random number N (Nmax×Ws) using the aforementioned function N(a) (step S44).

The random component addition section 32 adds the random number N (Nmax×Ws) thus generated to the signal value Lsmf after the smoothing as a random component amount N, and calculates a signal value Lrnd=(Lsmf+N) after random component addition (step S45).

More specifically, when Nr is a random number generated for the R signal, and Nb is a random number generated for the B signal, an R signal value Rrnd after false color suppression random component addition to the R signal and a B signal value Brnd after false color suppression random component addition to the B signal are calculated by the following equations:

$$Rrnd = Rsmf + Nr$$

$$Brnd = Bsmf + Nb$$

Then, the random component addition section 32 determines whether processing for all R pixels and B pixels has been finished (step S46).

If it is determined that the processing for all the R pixels and the B pixels has not yet been finished, the processing returns to step S41, described above. In step S41, processing is performed for the subsequent R pixel and B pixel.

On the other hand, if it is determined that the processing for all the R pixels and the B pixels has been finished, the processing returns to the processing illustrated in FIG. 6.

Then, the color noise suppression processing section 33 calculates a third R saturation evaluation value Sr_rnd as a ratio of the G signal value Grnd after the random component addition to the R signal value Rrnd after the false color suppression random component addition while calculating a third B saturation evaluation value Sb_rnd as a ratio of the G signal value Grnd after the random component addition to the B signal value Brnd after the false color suppression random component addition, as given by the following equations (step S16):

$$Sr\_rnd = Grnd/Rrnd$$

$$Sb\_rnd = Grnd/Brnd$$

Then, the color noise suppression processing section 33 performs color noise suppression processing for the R signal and the B signal (step S17).

Figure 10:
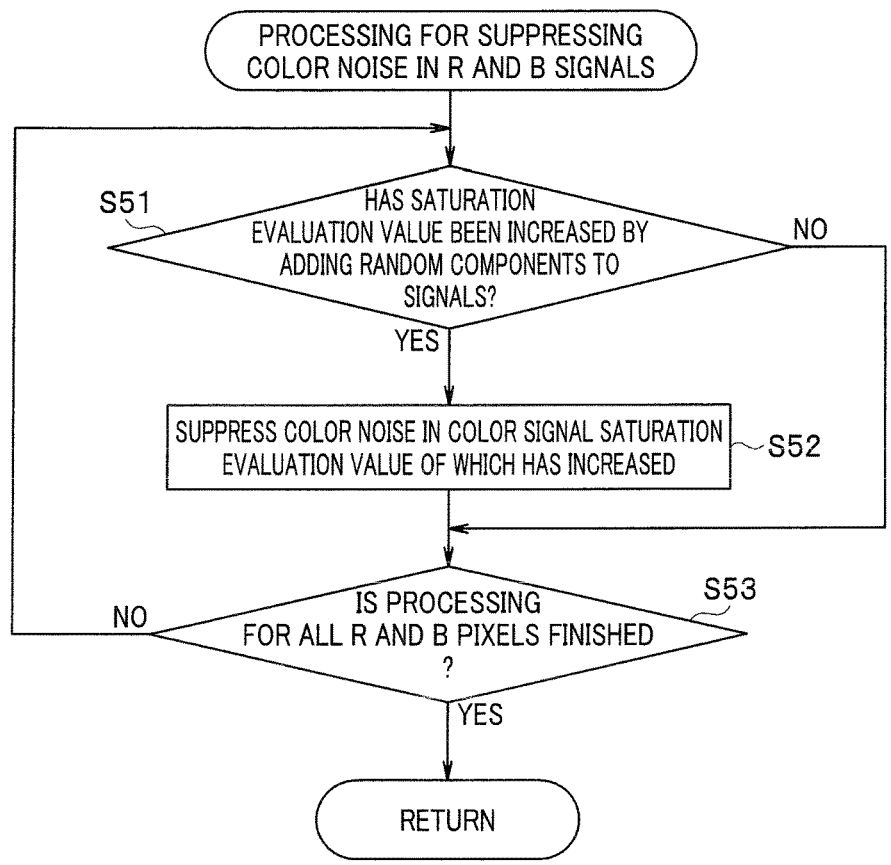
FIG. 10 is a flowchart illustrating processing for suppressing color noise in R and B signals in step S17 illustrated in FIG. 6 in the first embodiment.

FIG. 10 is a flowchart illustrating the color noise suppression processing for the R and B signals in step S17 illustrated in FIG. 6.

When the color noise suppression processing is started, the color noise suppression processing section 33 determines whether at least one of a saturation evaluation value of the R signal and a saturation evaluation value of the B signal has increased by adding a random component to the G signal, the R signal, and the B signal (step S51).

More specifically, the color noise suppression processing section 33 determines whether the third R saturation evaluation value Sr_rnd after the random component addition to the R signal is larger than the second R saturation evaluation value Sr_smf after the smoothing (i.e., Sr_smf<Sr_rnd) for the R signal, and determines whether the third B saturation evaluation value Sb_rnd after the random component addition to the B signal is larger than the second B saturation evaluation value Sb_smf after the smoothing (i.e., Sb_smf<Sb_rnd) for the B signal.

If it is determined that the saturation evaluation value of at least one of the R signal and the B signal has increased, the color noise suppression processing section 33 suppresses color noise in the color signal the saturation evaluation value of which has increased (step S52).

More specifically, the color noise suppression processing section 33 multiplies the R signal value Rsmf after the smoothing by the G signal value Grnd after the random component addition divided by the G signal value Gsmf after smoothing when the third R saturation evaluation value Sr_rnd is larger than the second R saturation evaluation value Sr_smf, to calculate an R signal value Rcnr after color noise suppression, as given by the following equation:

$$Rcnr = Grnd / Sr\_smf$$
$$= Rsmf \times Grnd / Gsmf$$

As illustrated on the first row, the calculation method is equal to the G signal value Grnd after the random component addition divided by the second R saturation evaluation value Sr_smf.

Similarly, the color noise suppression processing section 33 multiplies the B signal value Bsmf after the smoothing by the G signal value Grnd after the random component addition divided by the G signal value Gsmf after the smoothing when the third B saturation evaluation value Sb_rnd is larger than the second B saturation evaluation value Sb_smf, to calculate a B signal value Bcnr after color noise suppression, as given by the following equation:

$$Bcnr = Grnd / Sb\_smf$$
$$= Bsmf \times Grnd / Gsmf$$

As illustrated on the first row, the calculation method is equal to the G signal value Grnd after the random component addition divided by the second B saturation evaluation value Sb_smf.

If the process in step S52 is performed, or it is determined that the saturation evaluation value has not increased in step S51, the color noise suppression processing section 33 determines whether processing for all R pixels and B pixels has been finished (step S53).

If it is determined that the processing for all the R pixels and the B pixels has not yet been finished, the processing returns to step S51, described above. In step S51, processing is performed for the subsequent R pixel and B pixel.

If the foregoing processing is performed, an output from the spatial filter processing section 26 becomes a G signal value Grnd to which a random component has been added for the G signal. For the R signal, the output from the spatial filter processing section 26 becomes an R signal value Rrnd to which a false color suppression random component has been added when the saturation evaluation value has not increased, and becomes an R signal value Rcnr in which color noise has been suppressed when the saturation evaluation value has increased. Similarly, for the B signal, the output from the spatial filter processing section 26 becomes a B signal value Brnd to which a false color suppression random component has been added when the saturation evaluation value has not increased, and becomes a B signal value Bcnr in which color noise has been suppressed when the saturation evaluation value has increased.

Thus, if it is determined that the processing for all the R pixels and the B pixels has been finished in step S53, the processing returns to the processing illustrated in FIG. 6.

An example of how a signal value changes by the foregoing processing will be described with reference to FIGS. 18 to 21. In FIGS. 18 to 21, a horizontal axis represents a spatial position P, and a vertical axis represents a signal value L.

Figure 18:
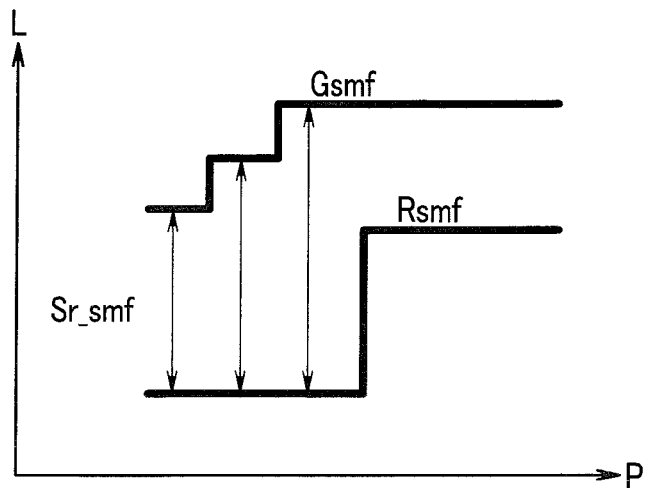
FIG. 18 is a diagram illustrating an example of a spatial distribution of a G signal and an R signal after smoothing in the first embodiment.

First, FIG. 18 is a diagram illustrating an example of a spatial distribution of a G signal and an R signal after smoothing.

When the G signal value Gsmf after the smoothing and the R signal value Rsmf after the smoothing constitute a spatial distribution as illustrated in FIG. 18, for example, the second R saturation evaluation value Sr_smf after the smoothing is calculated, as described above, by a ratio of the G signal value Gsmf to the R signal value Rsmf.

Figure 19:
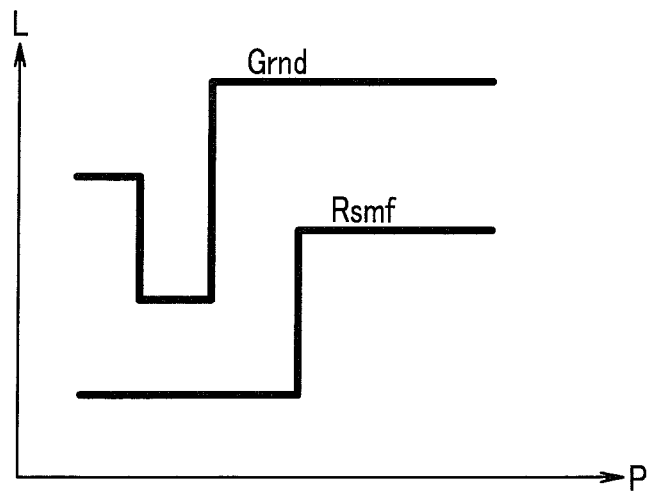
FIG. 19 is a diagram illustrating an example of a spatial distribution of a G signal and an R signal after a random component is added to the G signal illustrated in FIG. 18 in the first embodiment.

FIG. 19 is a diagram illustrating an example of a spatial distribution of a G signal and an R signal after a random component is added to the G signal illustrated in FIG. 18.

A random component is added to only the G signal value Gsmf after the smoothing, to calculate a G signal value Grnd. Therefore, a spatial distribution of Grnd changes from Gsmf while a spatial distribution of Rsmf does not change.

Figure 20:
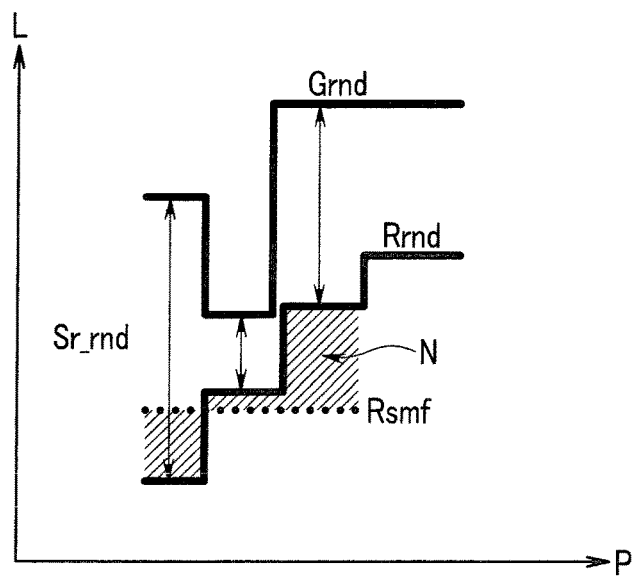
FIG. 20 is a diagram illustrating an example of a spatial distribution of an R signal and a G signal after a false color suppression random component is added to the R signal illustrated in FIG. 19 in the first embodiment.

Then, FIG. 20 is a diagram illustrating an example of a spatial distribution of an R signal and a G signal after a false color suppression random component is added to the R signal illustrated in FIG. 19.

When the false color suppression random component is added, a pixel at which a third R saturation evaluation value Sr_rnd has more decreased and a pixel at which the third R saturation evaluation value Sr_rnd has more increased occur in an R signal value Rrnd than those in an R signal value Rsmf. In FIG. 20, a hatched portion corresponds to a random component amount N added to the R signal value Rsmf.

Figure 21:
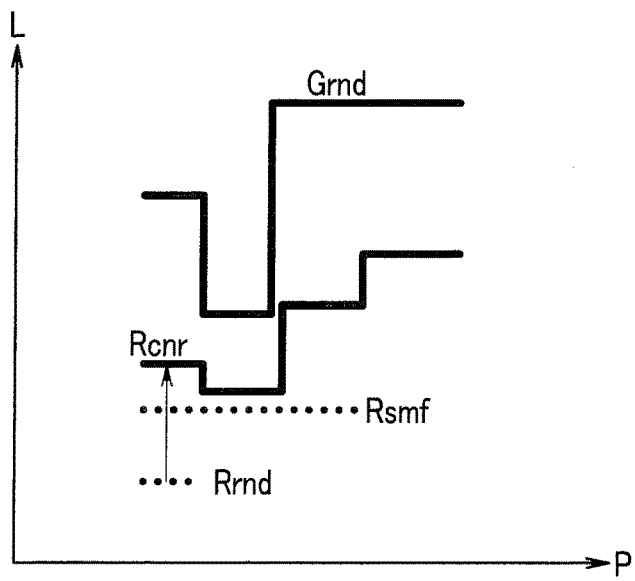
FIG. 21 is a diagram illustrating an example of a spatial distribution of an R signal and a G signal after color noise suppression processing is performed for the R signal illustrated in FIG. 20 in the first embodiment.

FIG. 21 is a diagram illustrating an example of a spatial distribution of an R signal and a G signal after color noise suppression processing is performed for the R signal illustrated in FIG. 20.

As described above, the color noise suppression processing is performed for only a pixel at which the third R saturation evaluation value Sr_rnd illustrated in FIG. 20 has more increased than the second R saturation evaluation value Sr_smf illustrated in FIG. 18. An R signal value Rcnr obtained by the processing becomes one in which color noise has been suppressed.

Thus, when the aforementioned processing is performed, random noise can be added while color noise is suppressed.

Note that the weights Wy, K, and Ws and the reference upper limit random component amount Nmax, as illustrated in FIGS. 14 to 17, may be respectively stored as functions in the flash memory 18, or may be respectively stored as tables in the flash memory 18.

The number of bits may be converted, although not particularly converted in the aforementioned spatial filter processing. That is, the number of bits may be converted so that the number of bits composing a signal outputted from the spatial filter processing section 26 is larger than the number of bits composing a signal inputted to the spatial filter processing section 26 while a signal after smoothing processing may become a signal for more smoothly changing a signal value according to the number of bits after multibit enlargement.

According to the first embodiment, a signal with a higher ratio (Weber ratio) of a quantization error caused by gradation conversion to a signal value (i.e., a signal a false contour of which is more conspicuous) is smoothed with higher strength, as illustrated in FIG. 14, for an image after gradation conversion, and a larger random component is added to a signal with the higher Weber ratio excluding the neighborhood of a minimum signal value, as illustrated in FIG. 16, for an image after smoothing. Therefore, the false contour of the image after the gradation conversion can be made less conspicuous in consideration of a visual characteristic of a person.

For a signal with a low Weber ratio, i.e., a signal in which a tone jump is difficult to visually recognize on monitor display according to a visual characteristic of a person, smoothing strength is reduced, and a random component to be added is reduced. Therefore, resolution deterioration of the image after the gradation conversion can be suppressed in consideration of the visual characteristic of the person.

As illustrated in FIG. 15, when a signal range Range serving as a signal value difference between a maximum signal value and a minimum signal value within an applied smoothing filter is not more than a predetermined lower limit threshold value or not less than a predetermined upper limit threshold value, weighting for making smoothing strength lower than when the signal range Range is between the lower limit threshold value and the upper limit threshold value. Therefore, the smoothing in a region where the signal value difference is small (a substantially flat image portion), which need not be smoothed, and a region where the signal value difference is large, which is considered to be an edge, can be reduced. Thus, unnecessary smoothing of a flat image portion can be suppressed while sharpness of the edge can be prevented from being lost by smoothing.

Furthermore, when a random component is added to an image after the smoothing, the random component is first added to a G signal, a first R saturation evaluation value and a first B saturation evaluation value are calculated using a G signal after the random component addition, and weighting for increasing the random component is performed to add the random component to an R signal/B signal if each of the evaluation values is in a predetermined range as illustrated in FIG. 17. Therefore, an amount of the random component to be added to the R signal and an amount of the random component to be added to the B signal are determined in consideration of an amount of the random component added to the G signal. Therefore, occurrence of a false color can be suppressed.

In addition, when a third R saturation evaluation value/third B saturation evaluation value based on an image after random component addition is larger than a second R saturation evaluation value/second B saturation evaluation value based on an image after smoothing, the same change rate as a change rate of a signal value of the G signal by random component addition is given to the R signal/B signal to suppress color noise. Therefore, color noise remaining after a false color suppression random component is added can be effectively suppressed.

Note that each of the aforementioned sections may be configured as a circuit. Any circuit may be mounted as a single circuit if the circuit can perform the same function. Alternatively, any circuit may be mounted as a combination of a plurality of circuits. Further, any circuit is not limited to one configured as a dedicated circuit for performing an aimed function but may be configured to perform the aimed function by causing a general-purpose circuit to execute a processing program.

While an image processing apparatus has been mainly described above, the present invention may be an image processing method for performing similar processing to that of the image processing apparatus, a computer program (image processing program) for causing a computer to perform the image processing method, a non-transitory computer readable recording medium storing the image processing program, and the like.

Having described the preferred embodiments of the invention referring to the accompanying drawings, it should be understood that the present invention is not limited to those precise embodiments and various changes and modifications thereof could be made by one skilled in the art without departing from the spirit or scope of the invention as defined in the appended claims.

What is claimed is:

1. An image processing apparatus comprising:
   a gradation conversion circuit configured to convert gradation of a pixel signal of an image according to a gradation conversion characteristic with which gradation display on a monitor becomes appropriate;
   a smoothing circuit configured to smooth a first pixel signal in which a Weber ratio is a first ratio and a second pixel signal in which the Weber ratio is a second ratio higher than the first ratio, the first pixel signal and the second pixel signal being in an image after the gradation conversion, the smoothing circuit being configured to smooth the second pixel signal with higher strength than the first pixel signal, the Weber ratio being a ratio of a quantization error to a value of the pixel signal, the quantization error being an error caused by the gradation conversion; and
   a random component addition circuit configured to add a random component to each of the first pixel signal and the second pixel signal in the image after the smoothing, the random component addition circuit being configured to add, to the second pixel signal, a random component larger than a random component added to the first pixel signal excluding a case in which at least one of the first pixel signal and the second pixel signal is in a neighborhood of a minimum signal value in a dynamic range of gradation,
   wherein the image processing apparatus makes a false contour of the image after the gradation conversion inconspicuous by performing the smoothing and adding of the random components.

2. The image processing apparatus according to claim 1, wherein the smoothing circuit further performs
   weighting for making a strength of the smoothing lower when a signal value difference between a maximum pixel signal value and a minimum pixel signal value within a region of a plurality of pixels to which a smoothing filter is applied is not more than a predetermined lower limit threshold value than when the signal value difference is between the lower limit threshold value and a predetermined upper limit threshold value, and
   weighting for making the strength of the smoothing lower when the signal value difference is not less than the upper limit threshold value than when the signal value difference is between the lower limit threshold value and the upper limit threshold value.

3. The image processing apparatus according to claim 1, wherein
   the image after the smoothing is an RGB color image, and
   the random component addition circuit adds the random component depending on a pixel signal value of each of an R signal, a G signal, and a B signal, first adds the random component to a G signal after the smoothing, and then calculates a ratio of a G signal after the random component addition to an R signal after the smoothing as a first R saturation evaluation value while calculating a ratio of the G signal after the random component addition to a B signal after the smoothing as a first B saturation evaluation value, performs weighting for increasing the random component when the first R saturation evaluation value is in a predetermined range to add the random component to the R signal, and performs weighting for increasing the random component when the first B saturation evaluation value is in a predetermined range to add the random component to the B signal.

4. The image processing apparatus according to claim 3, further comprising:
a color noise suppression processing circuit configured to calculate a ratio of the G signal after the smoothing to the R signal after the smoothing as a second R saturation evaluation value while calculating a ratio of the G signal after the smoothing to the B signal after the smoothing as a second B saturation evaluation value, further calculate a ratio of the G signal after the random component addition to an R signal after the random component addition as a third R saturation evaluation value while calculating a ratio of the G signal after the random component addition to a B signal after the random component addition as a third B saturation evaluation value, multiply the R signal after the smoothing by the G signal after the random component addition divided by the G signal after the smoothing to calculate an R signal after color noise suppression when the third R saturation evaluation value is larger than the second R saturation evaluation value, and multiply the B signal after the smoothing by the G signal after the random component addition divided by the G signal after the smoothing to calculate a B signal after color noise suppression when the third B saturation evaluation value is larger than the second B saturation evaluation value.

5. A non-transitory computer readable medium storing a computer program for causing a computer to execute:
converting gradation of a pixel signal of an image according to a gradation conversion characteristic with which gradation display on a monitor becomes appropriate;
smoothing a first pixel signal in which a Weber ratio is a first ratio and a second pixel signal in which the Weber ratio is a second ratio higher than the first ratio, the first pixel signal and the second pixel signal being in an image after the gradation conversion, wherein the second pixel signal being smoothed with higher strength than the first pixel signal, the Weber ratio being a ratio of a quantization error to a value of the pixel signal, the quantization error being an error caused by the gradation conversion; and
adding a random component to each of the first pixel signal and the second pixel signal in the image after the smoothing, wherein a random component larger than a random component added to the first pixel signal is added to the second pixel signal excluding a case where at least one of the first pixel signal and the second pixel signal is in a neighborhood of a minimum signal value in a dynamic range of gradation,
wherein a false contour of the image after the gradation conversion is made to be inconspicuous by the smoothing and adding of the random components.

6. An image processing method which is a method for causing a processor including hardware to execute:
converting gradation of a pixel signal of an image according to a gradation conversion characteristic with which gradation display on a monitor becomes appropriate;
a first pixel signal in which a Weber ratio is a first ratio and a second pixel signal in which the Weber ratio is a second ratio higher than the first ratio, the first pixel signal and the second pixel signal being in an image after the gradation conversion, wherein the second pixel signal being smoothed with higher strength than the first pixel signal, the Weber ratio being a ratio of a quantization error to a value of the pixel signal, the quantization error being an error caused by the gradation conversion; and
adding a random component to each of the first pixel signal and the second pixel signal in the image after the smoothing, wherein a random component larger than a random component added to the first pixel signal is added to the second pixel signal excluding a case where at least one of the first pixel signal and the second pixel signal is in a neighborhood of a minimum signal value in a dynamic range of gradation,
wherein the image processing method makes a false contour of the image after the gradation conversion inconspicuous by the smoothing and adding of the random components.

* * * * *